US008519822B2

(12) United States Patent
Riegebauer

(10) Patent No.: US 8,519,822 B2
(45) Date of Patent: Aug. 27, 2013

(54) APPARATUS FOR SELECTING A VIRTUAL CARD APPLICATION

(75) Inventor: Josef Riegebauer, Ilz (AT)

(73) Assignee: Infineon Technologies AG, Neubiberg (DE)

(*) Notice: Subject to any disclaimer, the term of this patent is extended or adjusted under 35 U.S.C. 154(b) by 1617 days.

(21) Appl. No.: 11/950,113

(22) Filed: Dec. 4, 2007

(65) Prior Publication Data

US 2008/0129450 A1 Jun. 5, 2008

(30) Foreign Application Priority Data

Dec. 4, 2006 (DE) .................. 10 2006 057 093

(51) Int. Cl.
*G05B 19/00* (2006.01)
(52) U.S. Cl.
USPC ............ 340/5.74; 340/5.8; 340/5.6; 340/5.4; 340/539.1; 340/539.11; 340/572.1; 340/10.1; 726/2
(58) Field of Classification Search
None
See application file for complete search history.

(56) References Cited

U.S. PATENT DOCUMENTS

| | | | | |
|---|---|---|---|---|
| 6,980,087 | B2* | 12/2005 | Zukowski | 340/10.51 |
| 7,844,831 | B2* | 11/2010 | Benhammou et al. | 713/189 |
| 2005/0086497 | A1 | 4/2005 | Nakayama | |
| 2005/0242921 | A1* | 11/2005 | Zimmerman et al. | 340/5.2 |
| 2005/0246292 | A1* | 11/2005 | Sarcanin | 705/67 |
| 2005/0255840 | A1* | 11/2005 | Markham | 455/422.1 |
| 2005/0286437 | A1* | 12/2005 | Matsushita et al. | 370/252 |
| 2006/0208066 | A1 | 9/2006 | Finn et al. | |
| 2007/0075133 | A1* | 4/2007 | Yeager | 235/380 |
| 2007/0113079 | A1* | 5/2007 | Ito et al. | 713/166 |
| 2008/0010685 | A1* | 1/2008 | Holtzman et al. | 726/27 |
| 2008/0072066 | A1* | 3/2008 | Vogler et al. | 713/187 |
| 2008/0073426 | A1* | 3/2008 | Koh et al. | 235/380 |
| 2008/0207128 | A1* | 8/2008 | Mikko | 455/41.2 |
| 2008/0298375 | A1* | 12/2008 | Agardh et al. | 370/397 |
| 2009/0199206 | A1* | 8/2009 | Finkenzeller et al. | 719/313 |

OTHER PUBLICATIONS

Mifare Standard Card IC MFI IC S50. Functional Specification, Product Specification Revision 5.0, Philips Semiconductors, Nov. 1999, S. 1-19.
Security & Chip Card ICs, SLE 55R16, Intelligent 2560-Byte EEPROM with Contactless Interface complying to ISO/IEC 14443 Type A and Security Logic. Short Product Information, Infineon Technologies, Jan. 2001, S. 1-8.

* cited by examiner

*Primary Examiner* — Benjamin C Lee
*Assistant Examiner* — Curtis King
(74) *Attorney, Agent, or Firm* — Schiff Hardin LLP

(57) ABSTRACT

An apparatus for selecting a virtual card application from a multi-application contactless card, including a receiver configured to receive an authentication command containing a card key from a card reader. The apparatus further includes a verifier configured to verify the card key in the virtual card applications and to select a card application for communication with the card reader by means of a key match. The apparatus further includes a transmitter configured to transmit a response of the selected card applications to the card reader.

25 Claims, 3 Drawing Sheets

APPARATUS FOR SELECTING A VIRTUAL CARD APPLICATION

CROSS-REFERENCE TO RELATED APPLICATIONS

This application claims priority from German Patent Application No. 102006057093.6, which was filed on Dec. 4, 2006, and is incorporated herein in its entirety by reference.

TECHNICAL FIELD

The present invention relates to an apparatus for selecting a virtual card application as are used, for example, in mobile phones or portable computers which support card emulation.

BACKGROUND

Modern contactless cards, so called smart cards, or also mobile devices suitable for NFC (near field communication), e.g. mobile phones, PDAs (personal digital assistants) comprising a contactless subsystem supporting card emulation can emulate several contactless applications. Such a contactless application per se represents a "virtual" contactless card, this virtual contactless card, however, being externally visible as a "physical card" only for the duration of a contactless transaction so as to be able to be compatible with existing contactless reader infrastructures (legacy systems).

The "legacy systems" installed on a worldwide basis in conventional technology do not support the concept of "virtual cards". The term "anti-collision" is known from conventional technology and relates to selecting a physical card from among a plurality of physical cards which are simultaneously presented to a contactless reader. An unambiguous selection and activation of an adequate virtual card without any intervention in existing infrastructures and while complying with existing standards, i.e. on all physical and logical layers of the contactless protocols, is not provided within a protocol in the context of conventional technology. A selection of such applications may be effected via different HF communication technologies (HF=high frequency), such as ISO 14443 Type A, Type B, ISO 18092, or ISO 15693, etc.

Conventional Technology further knows a selection procedure of an application within the same communication technology, or within the same protocol, by means of differentiation within a global application identifier (AID=application identifier) as is described in ISO 7816-5.

In addition, it is possible to select from applications within the same HF communication technology by different protocols for handling the card, such as an ISO 14443-4 application toward propriety schemes such as Mifare or My-D, all using HF communication technology ISO 14443-3 Type A, but differing with regard to the encoding of the commands.

A selection procedure by means of information from external devices, such as identification of the target application from context information which was communicated, for example, by a mobile phone via RFID (radio frequency identification), Bluetooth, etc., is feasible, in principle, in so far as the means for receiving for processing the context information exist. However, conventional technology offers no method able to differentiate an application within the same communication technology, such as ISO 14443 Type A, on the basis of the same protocols and without modifying same. Administration of several virtual cards is thus not possible, or is possible only with clearly increased complexity at the infrastructure level so as to enable the conventional methods.

SUMMARY

Embodiments of the invention comprise an apparatus for selecting a virtual application of a device suitable for many applications, comprising receive unit configured to receive an authentication command from which information about a key of a reading device may be derived, verifying unit configured to verify, by means of the information from the authentication command, whether one of the virtual applications and the reading device share a key, and to select an application for a communication with the reading device by means of a key match, and transmit unit configured to transmit a response of the selected application to the reading device.

BRIEF DESCRIPTION OF THE FIGURES

Embodiments of the present invention will be detailed subsequently referring to the appended drawings, in which.

DETAILED DESCRIPTION

Figure 1:
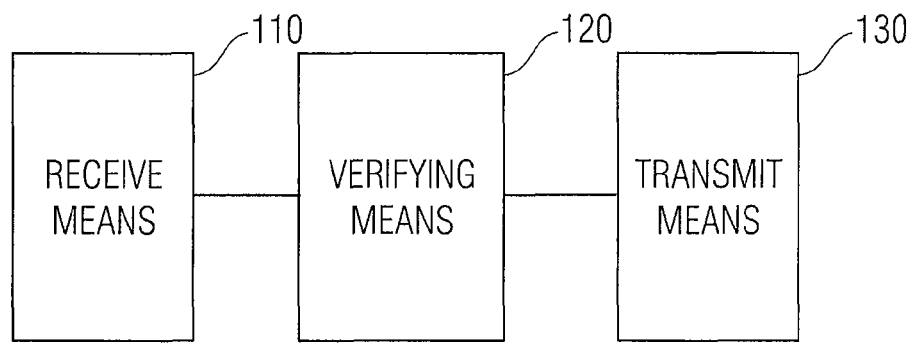
FIG. 1 shows an embodiment of an apparatus for selecting a virtual card application.

Before embodiments of the present invention shall be explained in more detail below with reference to the figures, it shall be noted that identical elements in the figures are provided with identical or similar reference numerals, and that repeated description of these elements shall be omitted.

Embodiments benefit from a mutual authentication mechanism which may be used by applications, for example, which utilize a cryptographic algorithm, such as My-D, Mifare Classic, before a communication with a contactless reader is taken up. Therefore, embodiments are also suitable for NFC devices which are in the "emergency mode" energetic operating condition, in this case the energy for the contactless subsystem is obtained exclusively from the HF field, a user interface such as a keyboard or a screen will then not be available for the application selection. Embodiments do not significantly limit the number of virtual cards among which a selection is made. Upon reception of the authentication command, embodiments will search existing virtual cards for key matches. This may be realized, for example, by an association algorithm which may be implemented both in hardware and in software. In the event of a match, the virtual card in question is selected, and a response is sent back to the card reader. In practical cases of application, multiple matches are to be largely excluded because of the usual key space dimensions.

Other embodiments search the virtual cards in individual transactions, that is upon receiving an authentication command, they will verify only one virtual card for a key match, and will send no response to the card reader in the event of a mismatch. In addition, an indicator may be stored, for the card excluded, in a non-volatile memory, so that subsequently, embodiments temporarily will no longer verify this card. It may be assumed that after a timeout, or possibly after an HF field reset, a contactless reader will perform a new anti-collision, i.e will repeat a respective authentication command. The authentication command repeated will then include, in a common implementation, the same key information.

On the part of the embodiment, a freely selectable strategy may be implemented within the context of the multi-application card, in accordance with which strategy a virtual card other than that which was the last to be unsuccessfully verified will be selected for authentication. Embodiments which include, for example, the authentication mechanism described, may thus serve a significant number of existing systems on the market. In addition, one may assume that a possible delay caused by the individual verifications of the individual virtual cards will be within the range of several milliseconds and may thus be considered irrelevant. In other embodiments, parallel verification routines may also be realized.

Embodiments thus realize a method for selecting an emulation of a specific virtual card application from a number of contactless virtual card applications of a multi-application contactless card or a contactless subsystem of an NFC device without user interface. Embodiments may be adapted to applications without distinguishing features in their contactless technology or in their protocols, specifically also to types of applications which use authentication mechanisms.

FIG. 1 shows an embodiment of an apparatus 100 for selecting a virtual card application from a multi-application contactless card. The apparatus 100 comprises a receive unit 110 for receiving an authentication command from which information about a key of a card reader may be derived. In addition, the apparatus 100 comprises a verifying unit 120 to verify, using the information from the authentication command, whether any of the virtual card applications and the card reader share a key, and for selecting a card application for communicating with the card reader by means of a key match. The apparatus 100 further comprises a transmit unit 130 for transmitting a response of the card applications selected to the card reader. In accordance with embodiments, the authentication command contains a message encrypted with the shared key of the card reader and the card, or one of the applications on the card, so that the card may ascertain, for example in compliance with ISO 9798-2, whether the message was encrypted using a shared key.

In a further embodiment, the verifying unit 120 may further comprise an emulation unit for emulating the card application selected and for generating a response of the card application selected. In addition, there may be memory for storing the virtual card applications. Embodiments may be implemented, for example, in portable devices such as mobile telephones, PDAs or portable computers. In one embodiment, the verifying unit 120 may be configured to simultaneously verify, for selecting the card application, the virtual card applications, and to select that card application which provides a key match. In addition, the verifying unit 120 may, for selecting the card application, sequentially verify the virtual card applications and temporarily exclude card applications which comprise unsuccessful verifications from being verified so as to achieve the goal in several verification intervals.

The apparatus 100 and particularly the receive unit 110 may be designed, in embodiments, to receive signals in compliance with at least one of ISO 14443 Type A, ISO 14443 Type B, ISO 18092, or ISO 15693, and the transmit unit 130 may also be configured to transmit signals in compliance with at least one of these standards. Also, the verifying unit 120 may be configured to verify the card applications in accordance with an authentication mechanism in compliance with ISO 9798-2.

Figure 2A:
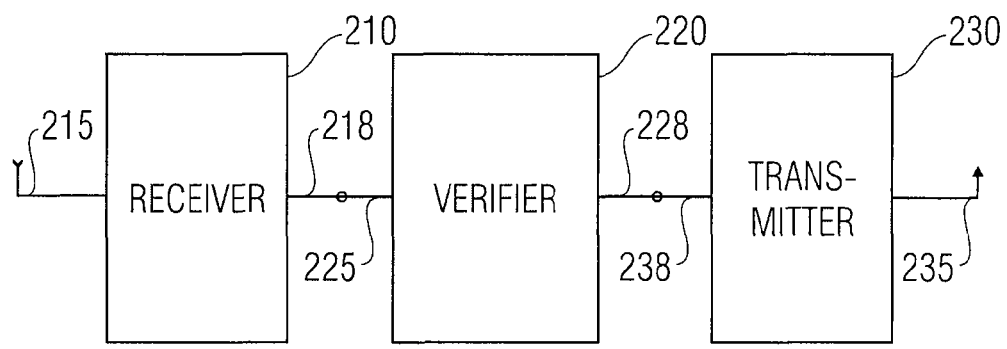
FIG. 2a shows an embodiment of a selection circuit.

FIG. 2a shows an embodiment of a selection circuit 200. The selection circuit 200 comprises a receiver 210 which is coupled to a receive antenna 215 and has an output 218 for a receive signal. The verifier 220 comprises an input 225 coupled to the output 218 for the receive signal and to an output 228 for a response signal. The transmitter 220 includes an input 238 coupled to the output 228 for the response signal.

In another embodiment, the verifier 220 may further comprise an interface for a plurality of virtual card applications which may be coupled to a multi-application controller card, so that in another embodiment, the verifier 220 is coupled to a multi-application controller card.

Furthermore, an embodiment may comprise a multi-application controller card having a memory within which at least one virtual card application may be stored. The selection circuit 200 may be integrated, for example, into a portable device—feasible such devices being mobile telephones, PDAs, portable computers, etc.

In a further embodiment, the verifier 220 may further comprise an emulator, having an input for the receive signal, a selection input, and an output for the response signal. The emulator may then emulate the card application selected and thus generate the response signal. The receiver 210 may be designed, in embodiments, such that a receive signal in compliance with at least one of ISO 14443 Type A, ISO 14443 Type B, ISO 18092, or ISO 15693 may be received at its output 218 for the receive signal, and the transmitter, in turn, may be configured to transmit respective signals of these standards. Accordingly, in such embodiments, the response signal is also adapted to the specifications of these standards.

Figure 2B:
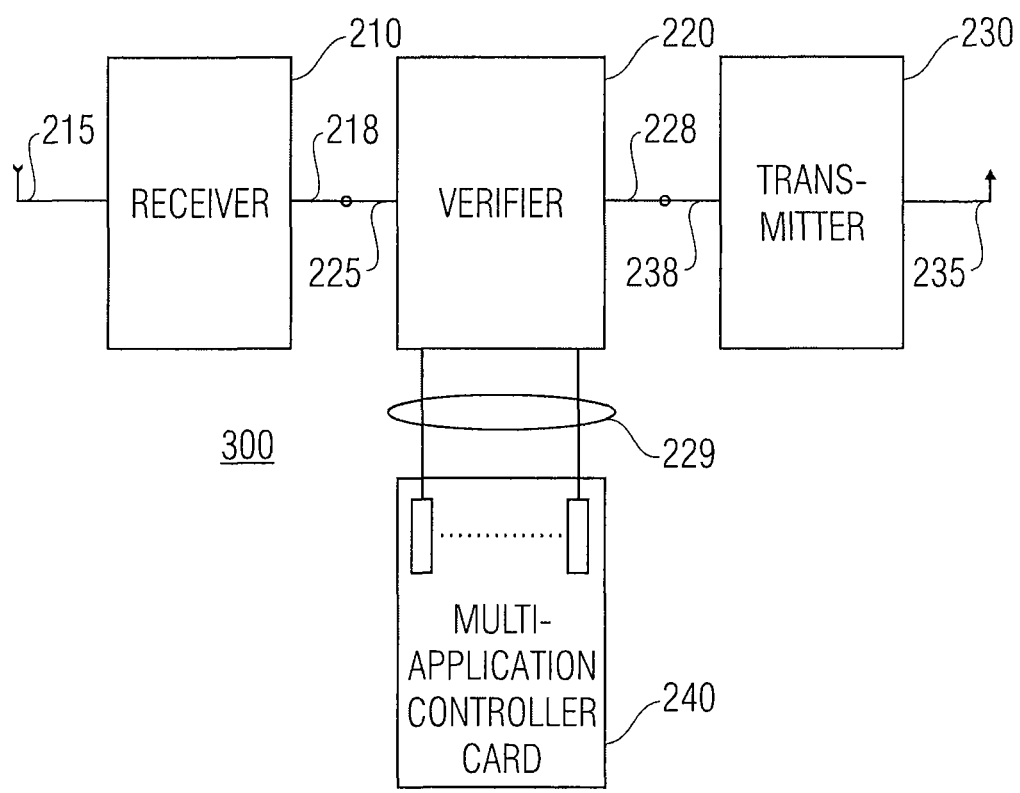
FIG. 2b shows a further embodiment of a selection circuit.

FIG. 2b shows a further embodiment of a selection circuit 300 comprising a receiver 210 having an output 218 at which a receive signal is present from which information about an authentication key may be derived. The selection circuit 200 further comprises a verifier 220, having an input 225 coupled to the output 218 of the receiver 210, an interface 229 for several virtual card applications via which the authentication key may be verified, and having an output 228 for a response signal of a virtual card application for which the authentication key may be verified. The selection circuit 300 further comprises a multi-application controller card 240 which is coupled to the interface 229 for several virtual card applications and comprises a memory storing at least two virtual card applications. The selection circuit 300 further comprises a transmitter 230 having an input 238 coupled to the output 228 for the response signal. Optionally, the receiver 210 may be coupled to a receive antenna 215, and the transmitter 230 may be coupled to a transmit antenna 235.

In another embodiment, the verifier 220 may comprise an emulator which provides the response signal by emulating the virtual card application for which the authentication key may be verified. In addition, the multi-application controller card 240 may store virtual card applications or card applications of the same type or in the same communication technology.

In a further embodiment, the verifier 220 may be configured to verify the authentication key using a protocol, the protocol corresponding, for example, to one of the Mifare Classic or My-D standards (Mifare Classic is a trademark by Philips/NXP, My-D is a trademark by Infineon Technologies). In other embodiments, for verifying the authentication key, the verifier may further temporarily store indicators for card applications comprising failed verifications, so that these card applications will be excluded from verifications for a specific period of time.

In accordance with above explanations, the selection circuit, in particular the receiver 210 and the transmitter 230, may be designed to communicate in compliance with one of ISO 14443 Type A, ISO 14443 Type B, ISO 18092, or ISO 15693. In addition, the verifier 220 may be designed to verify the authentication key in compliance with ISO 9798-2.

Figure 3:
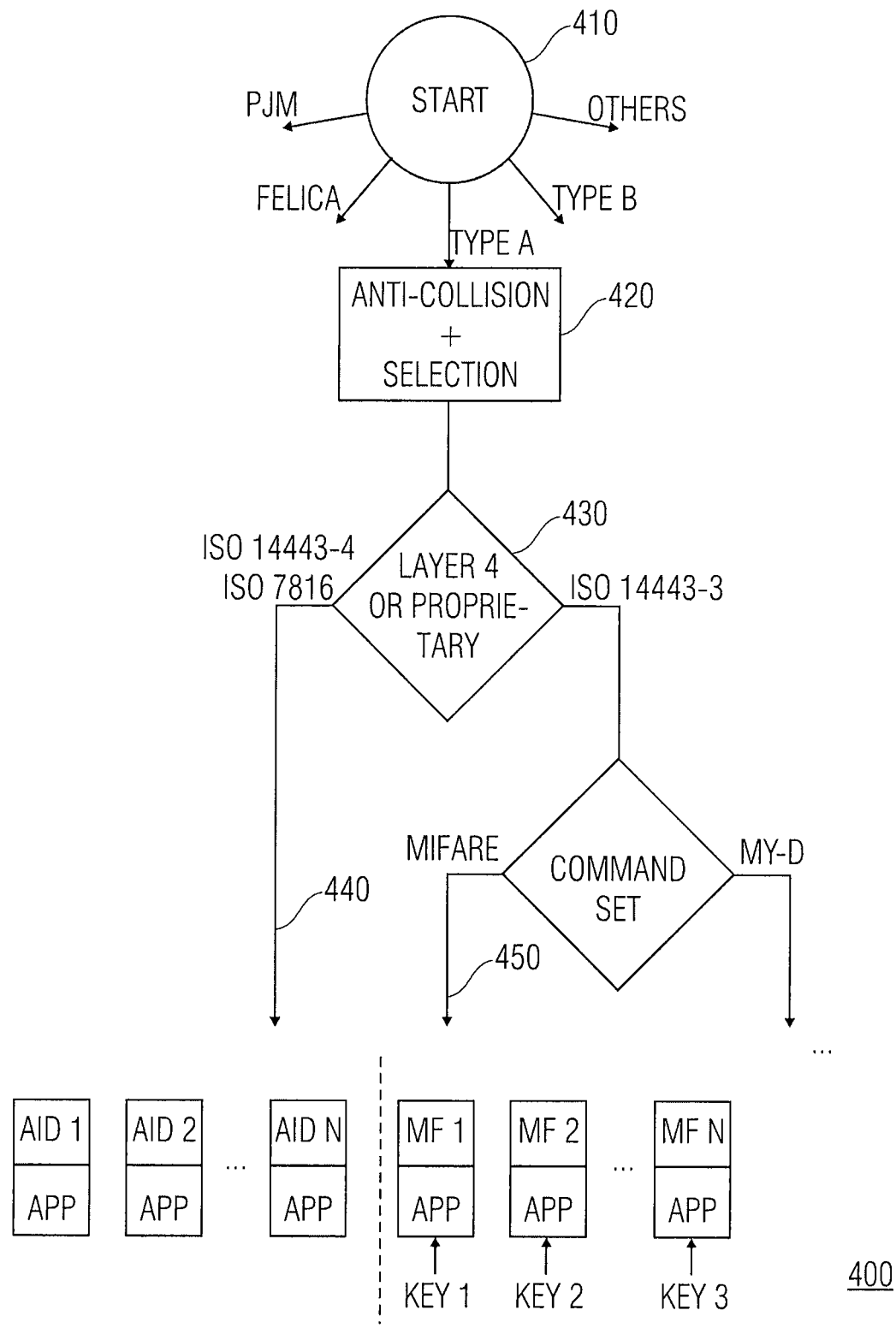
FIG. 3 shows an embodiment of a method for selecting a virtual card application.

FIG. 3 shows a flow chart 400 elucidating an embodiment of a method. The method starts in a step 400 wherein a protocol in question, such as ISO 14443 Type A, is selected.

In other embodiments, other protocols such as FeliCa, PJM (PJM=phase jitter modulation), etc. are also feasible.

Via the anti-collision procedure and the selection which are performed in a step 420, the respective communication with a virtual card application is prepared. In a step 430, the respective layer-4 protocols are chosen, the left-hand side 440 of FIG. 3 depicting a conventional method choosing an application from several applications by means of an application identification (AID). One embodiment is depicted at 450, where various Mifare Classic applications are represented which have different keys, respectively. By trying out the authentication key, which is used for the transmission, at the various Mifare Classic applications, the application sought for is identified.

One embodiment may be realized in an NFC device comprising a contactless subsystem having an NFC modem for performing a contactless communication. In addition, the NFC device may comprise a Secure element, for example a SIM card having a suitable operating system. A plurality of contactless virtual card applications, e.g. five "Mifare Classic" applications, which use the 3-pass authentication in compliance with ISO 9798-2, for example, may be mapped as "virtual cards" in an NVM (NVM=non-volatile memory). Following anti-collision, cf. step 420 in FIG. 3, the authentication command for "Mifare Classic" is received, and an authentication mechanism, a so-called "challenge", in compliance with ISO 9798-2 is transmitted. The response of the contactless reader is already encrypted with the authentication key of the target application. A mechanism which may be implemented both in hardware and in software verifies all virtual cards for a key match and selects, in the event of a success, the matching virtual card as the active card. For example, in compliance with ISO 9798-2, the response of the card may be calculated and transmitted to the contactless reader which will then continue the applications. In another embodiment, a single virtual card application may initially be used, for example, an indicator being stored in the unsuccessful case, which indicator excludes this card application from being verified for a certain amount of time so as to successively identify the correct card application.

It shall be noted, in particular, that depending on the circumstances, embodiments may also be implemented in software. Implementation may be on a digital storage medium, in particular a disc, a CD or DVD with electronically readable control signals which interact with a programmable computer system such that the respective method is performed. Generally, embodiments thus may also be realized as a computer program product having a program code, stored on a machine-readable carrier, for performing the respective method, when the computer program product runs on a computer. In other words, embodiments may thus be realized as a computer program having a program code for performing the method, when the computer program product runs on a computer.

Embodiments of the invention have been described above with reference to a multi-application contactless card or a device suitable for NFC (near field communication). The invention is not limited thereto. Embodiments of the invention may select an application of a device suitable for many applications, e.g. a card which may be read via contacts.

Embodiments of the invention relate to the interplay between a card and a reading device (card reader). However, the invention is not limited thereto. Further embodiments of the invention relate to the selection of an application of a device, e.g. an NFC device, which communicates with a reading device, e.g. a further NFC device. The device is, e.g., a device suitable for many applications which represents several applications (e.g. card applications) which may be handled by a reading device, e.g. a card reader.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. An apparatus for selecting an application of a device, the apparatus comprising:
    a receive unit configured to receive an authentication command encrypted using a key of a reading device which communicates with the device;
    a verifying unit configured to verify whether one of the applications and the reading device share a key, based on a determination whether the authentication command has been encrypted using a key of one of the applications, until a key match is found, and to select for a communication with the reading device an application having a matching key; and
    a transmit unit configured to transmit a response of the selected application to the reading device.

2. The apparatus as claimed in claim 1, wherein the verifying unit further comprises an emulation unit configured to emulate the application selected and to generate a response of the application selected.

3. The apparatus as claimed in claim 1, further comprising a memory configured to store the application.

4. The apparatus as claimed in claim 1, which is integrated within a portable device.

5. The apparatus as claimed in claim 4, which is implemented in a mobile telephone, a PDA or a portable computer.

6. The apparatus as claimed in claim 1, wherein the verifying unit is adapted, for selecting the application, to simultaneously verify the applications and to select that application which provides a key match.

7. The apparatus as claimed in claim 1, wherein the verifying unit is adapted to select the application, to sequentially verify the applications, and to temporarily exclude applications having an unsuccessful verification from being verified.

8. The apparatus as claimed in claim 1, wherein the receive unit is adapted to receive signals in compliance with at least one of ISO 14443 Type A, ISO 14443, Type B, ISO 18092, or ISO 15693, and the transmit unit is adapted to transmit signals in compliance with at least one of ISO 14443 Type A, ISO 14443 Type B, ISO 18092, or ISO 15693.

9. The apparatus as claimed in claim 1, wherein the verifying unit is adapted to verify the card application in accordance with an authentication mechanism in compliance with ISO 9798-2 standards.

10. A selection circuit comprising
    a receiver comprising an output configured to output a receive signal, the receive signal including an authentication command encrypted using an authentication key of a reading device;
    a verifier comprising an input coupled to the output of the receiver, an interface for several virtual applications and configured to verify, whether one of the virtual applications and the reading device share an authentication key based on a determination whether the authentication command has been encrypted using an authentication key of one of the virtual applications, until an authentication key match is found, and an output for a response signal of a virtual application having a matching authentication key;

a device suitable for many applications which is coupled to the interface for several virtual applications and comprises a memory storing at least two virtual applications; and a transmitter comprising an input coupled to the output for the response signal.

11. The selection circuit as claimed in claim 10, wherein the verifier comprises an emulator configured to provide the response signal by emulating the virtual application for which the authentication key may be verified.

12. The selection circuit as claimed in claim 10, wherein the device suitable for many applications is configured to store virtual applications of the same type or in the same communication technology.

13. The selection circuit as claimed in claim 10, wherein the verifier is adapted to verify the authentication key using a protocol.

14. The selection circuit as claimed in claim 13, wherein the protocol corresponds to one of the Mifare Classic or My-D standards.

15. The selection circuit as claimed in claim 10, wherein indicators for applications which comprise unsuccessful verifications may further be temporarily stored by the verifier for verifying the authentication key.

16. The selection circuit as claimed in claim 10, wherein the receiver and the transmitter are adapted to communicate in compliance with at least one of ISO 14443 Type A, ISO 14443 Type B, ISO 18092, or ISO 15693.

17. The selection circuit as claimed in claim 10, wherein the authentication key may be verified by the verifier in compliance with the ISO 9798-2 standard.

18. A method for selecting an application from a plurality of applications of a device, the method comprising:

receiving an authentication command encrypted using a key of a reading device which communicates with the device;

verifying whether one of the applications and the reading device share a key, based on a determination whether the authentication command has been encrypted using a key of one of the applications, until a key match is found;

selecting an application having a matching key; and responding in accordance with the application selected.

19. The method as claimed in claim 18, wherein the selecting further comprises emulating the application selected.

20. The method as claimed in claim 18, comprising storing the plurality of applications prior to the receiving.

21. The method as claimed in claim 18, wherein the verifying comprises sequentially verifying the individual application of the plurality of applications.

22. The method as claimed in claim 18, wherein the verifying comprises simultaneously verifying at least two applications of the plurality of applications.

23. The method as claimed in claim 18, wherein the verifying comprises excluding the application if verifying the virtual application was unsuccessful.

24. A method for selecting a virtual card application on a multi-application controller card providing at least two virtual card applications, the method comprising:

receiving information encrypted using a key of a card reader;

verifying, in at least two virtual card applications, whether one of the virtual card applications and the card reader share a key, based on a determination whether the information has been encrypted using a key of one of the applications, until a key match is found;

identifying a key match with a matching card application of the at least two virtual card applications;

emulating the matching card applications;

responding to the card reader in compliance with a protocol and the matching card application.

25. The method as claimed in claim 24, further comprising storing the at least two virtual card applications.

* * * * *